United States Patent
Hicks, III

(10) Patent No.: US 8,437,468 B2
(45) Date of Patent: May 7, 2013

(54) METHODS, SYSTEMS AND PRODUCTS FOR PROVIDING MODEM FUNCTIONS

(75) Inventor: John Alson Hicks, III, Roswell, GA (US)

(73) Assignee: AT&T Intellectual Property I, L. P., Atlanta, GA (US)

(*) Notice: Subject to any disclaimer, the term of this patent is extended or adjusted under 35 U.S.C. 154(b) by 838 days.

(21) Appl. No.: 12/576,269

(22) Filed: Oct. 9, 2009

(65) Prior Publication Data

US 2011/0085647 A1   Apr. 14, 2011

(51) Int. Cl.
*H04M 1/00* (2006.01)
*H04M 9/00* (2006.01)

(52) U.S. Cl.
USPC ............... 379/399.02; 379/92.04; 379/93.01; 379/93.05; 379/413

(58) Field of Classification Search ............... 379/92.04, 379/93.05, 93.01, 399.02, 413, 93.04
See application file for complete search history.

(56) References Cited

U.S. PATENT DOCUMENTS

| | | | |
|---|---|---|---|
| 6,028,769 A | 2/2000 | Zurek | |
| 6,876,834 B2 | 4/2005 | Wilson | |
| 7,007,296 B2 | 2/2006 | Rakib | |
| 7,035,270 B2 | 4/2006 | Moore, Jr. et al. | |
| 7,433,361 B1 | 10/2008 | Smith | |
| 7,512,220 B2 | 3/2009 | Hermans et al. | |
| 7,522,812 B2 | 4/2009 | Zitting | |
| 2004/0163125 A1 | 8/2004 | Phillips et al. | |
| 2009/0074155 A1 | 3/2009 | Wang et al. | |
| 2009/0322556 A1* | 12/2009 | Cook et al. | 340/870.02 |
| 2010/0157989 A1* | 6/2010 | Krzyzanowski et al. | 370/352 |

* cited by examiner

*Primary Examiner* — Gerald Gauthier
*Assistant Examiner* — Simon King
(74) *Attorney, Agent, or Firm* — Scott P. Zimmerman PLLC

(57) ABSTRACT

Methods, systems, and products are disclosed that describe a network interface to a data network. A modulator-demodulator receives a modulated carrier signal from an input connection. A power circuit connected to the input connection receives electrical power from a loop plant and provides the electrical power to the modulator-demodulator.

7 Claims, 20 Drawing Sheets

METHODS, SYSTEMS AND PRODUCTS FOR PROVIDING MODEM FUNCTIONS

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

Exemplary embodiments generally relate to telephonic communications, to digital communications, and to multiplex communications and, more particularly, to transmission of digital signals over telephone lines, to modulator-demodulators, and to pathfinding and routing.

Network interfaces can be improved. A network interface device serves as a demarcation point between a cable or telephone local loop and a customer's network. Because nearly every home, building, and business has a network interface device, improvements are continually desired.

SUMMARY

Exemplary embodiments describe a network interface device that improves performance and reduces costs. Exemplary embodiments incorporate a modulator-demodulator (or "modem") into the network interface device. When the modulator-demodulator is moved inside an enclosure that houses the network interface device, there is no need for a data cable that runs from the network interface device to the modulator-demodulator. The cost of the cable is eliminated, and electromagnetic losses due to the cable are also eliminated. Because the modulator-demodulator is incorporated into the network interface device, the modulator-demodulator may be diagnosed without contacting the customer. Moreover, when the network interface device is installed in a common area or on an exterior wall, the modulator-demodulator may be serviced or replaced without requiring access to the customer's premises. Should the customer move to another residence, the modulator-demodulator remains in the network interface device to service a new customer. Exemplary embodiments may also provide electrical power to the modulator-demodulator, and the network interface device may be upgraded to include expansion cards.

Exemplary embodiments include a network interface device. A modulator-demodulator receives a modulated carrier signal from an input connection. A power circuit is connected to the input connection and receives electrical power from a loop plant. The power circuit provides the electrical power to the modulator-demodulator.

Exemplary embodiments may include other features. The modulator-demodulator may be installed within an outdoor enclosure. The modulator-demodulator receives the modulated carrier signal from an input connection to a digital subscriber line. The power circuit receives electrical power applied to the digital subscriber line and provides the electrical power to the modulator-demodulator.

Exemplary embodiments may include even more features. The modulator-demodulator may be installed within the outdoor enclosure, and the modulator-demodulator receives the modulated carrier signal from an input connection. An Ethernet interface receives digital data from the modulator-demodulator. A first port has eight conducting pins, with four of the eight conducting pins reserved for Ethernet signals received from the Ethernet interface, and with two of the eight conducting pins receiving electrical power and providing the electrical power to the modulator-demodulator. Two more pins may send and receive tip and ring voice signals.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
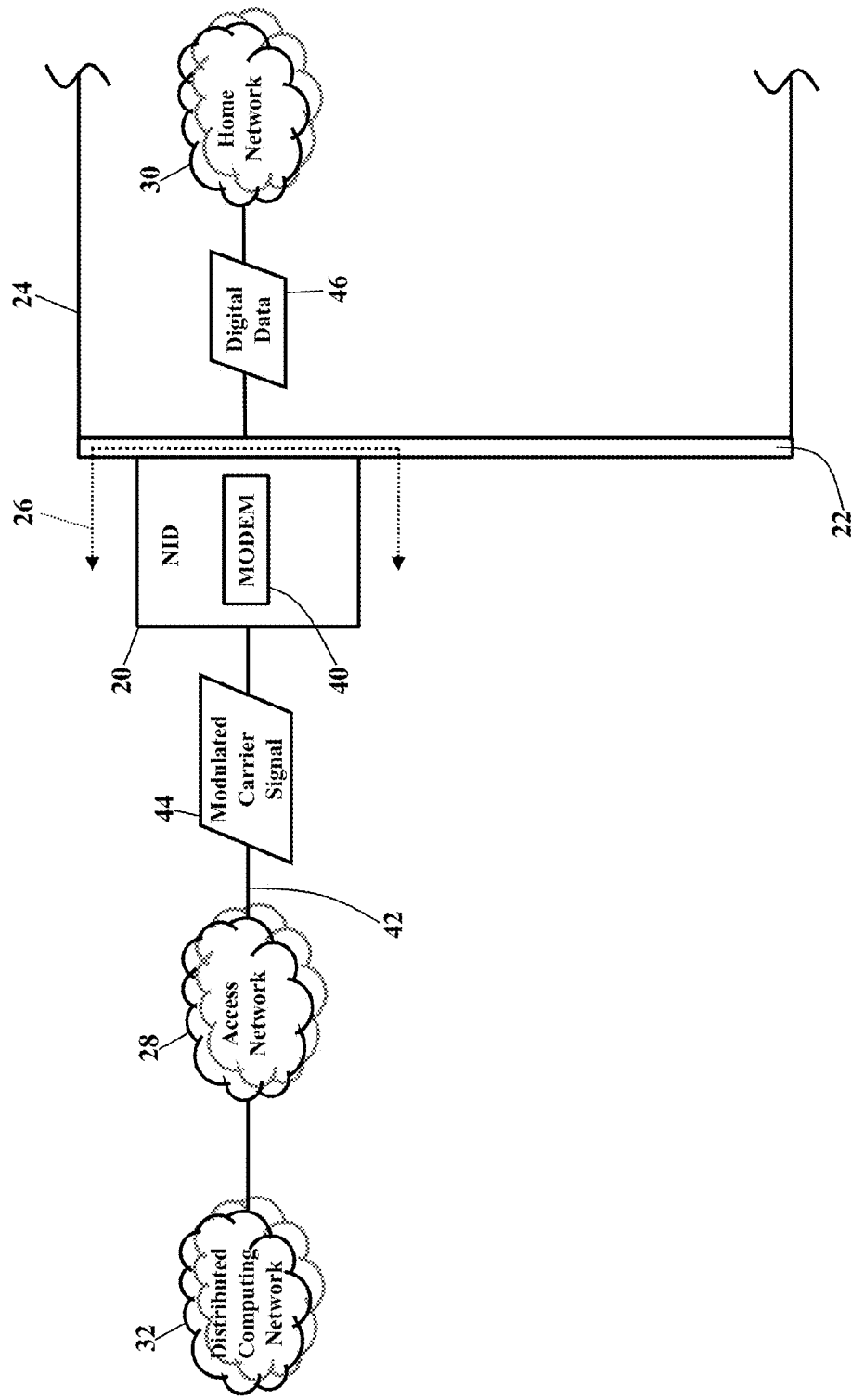
FIG. 1 is a simplified schematic illustrating an operating environment, according to exemplary embodiments.

FIG. 1 is a simplified schematic illustrating an operating environment, according to exemplary embodiments. A network interface device ("NID") 20 is illustrated as being mounted to an exterior wall 22 of a customer's premise 24. The network interface device 20 provides a demarcation 26 between an access network 28 and the customer's home network 30. The access network 28 provides access to a distributed computing network 32 (such as the Internet). The access network 28 commonly connects the network interface device 20 to a network or service provider.

The network interface device 20 incorporates a modulator-demodulator 40. The modulator-demodulator 40 has an input connection 42 to the access network 28. The modulator-demodulator 40 has a physical connection to the customer's home network 30. The modulator-demodulator 40 receives a modulated carrier signal 44 from the access network 28. The modulator-demodulator 40 performs a demodulation to decode digital data 46 contained within the modulated carrier signal 44. The modulator-demodulator 40 may also send information upstream into the access network 28 by encoding digital data into an upstream modulated carrier signal. Because the operation of the modulator-demodulator 40 is well-known, no detailed explanation is needed.

The modulator-demodulator 40 further establishes the demarcation 26. Because the modulator-demodulator 40 is installed in the network interface device 20, exemplary embodiments move the modulator-demodulator 40 into the access network 28. The modulator-demodulator 40 thus further clarifies the demarcation 26 between the access network 28 and the customer's home network 30. A network or service provider may thus test the operation of the modulator-demodulator 40 without entering the customer's premise 24. The network or service provider may also remotely monitor the performance and operation of the modulator-demodulator 40, again without entering the customer's premise 24. Should the modulator-demodulator 40 require and upgrade or replacement, the network or service provider may access the modulator-demodulator 40 from inside the network interface device 20, without entering the customer's premise 24. If the customer moves to another domicile, the modulator-demodulator 40 remains with the network interface device 20 to serve a new customer.

Figure 2:
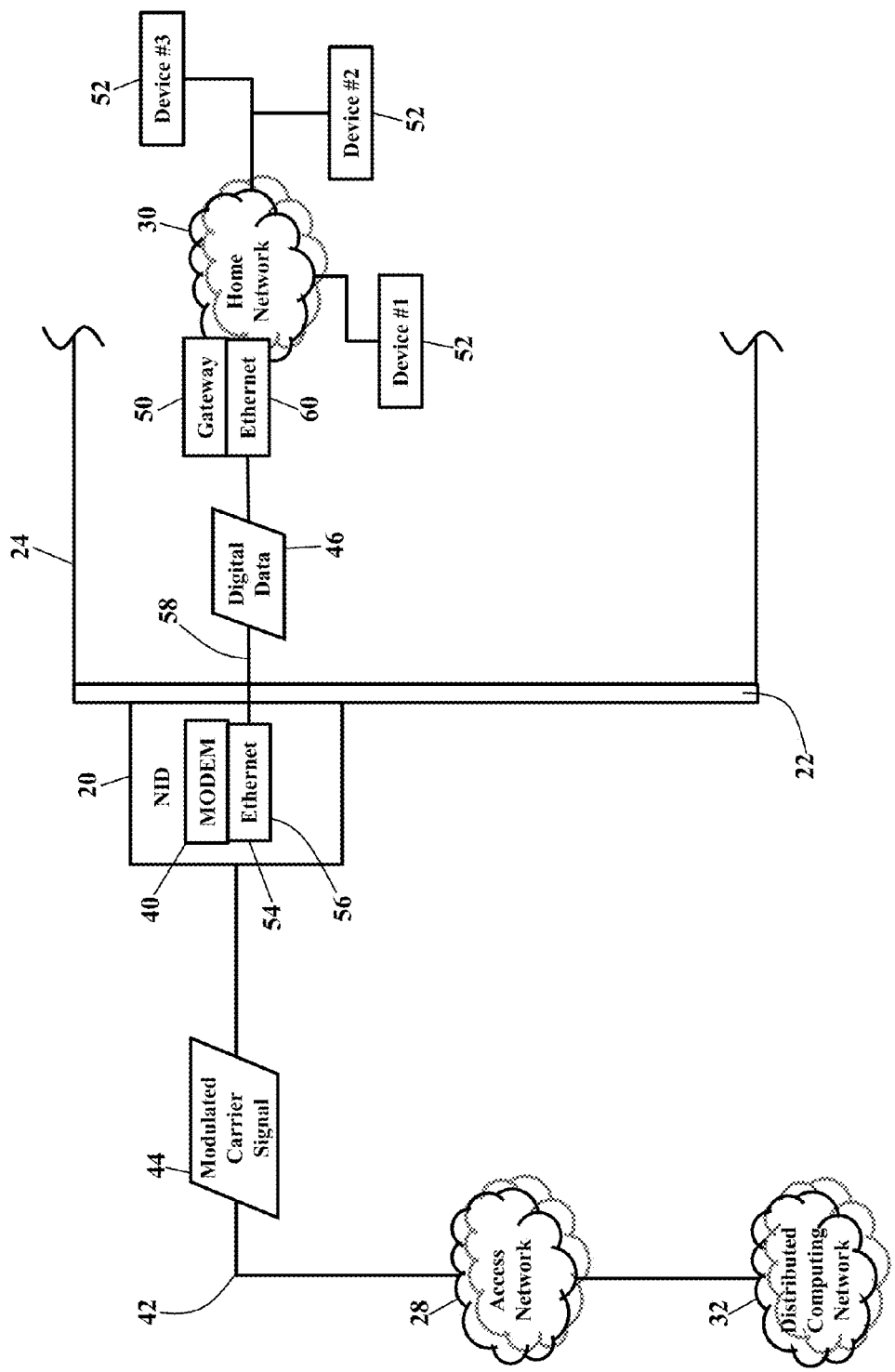
FIGS. 2-6 are more detailed schematics illustrating the operating environment, according to exemplary embodiments.

FIGS. 2-6 are more detailed schematics illustrating the operating environment, according to exemplary embodiments. Here the network interface device ("NID") 20 communicates with a gateway 50. The gateway 50 may be installed within the customer's premise 24. The gateway 50 is any device that connects devices 52 in the customer's home network 30 to the access network 28 and to the distributed computing network 32. The gateway 50 may also perform router functions to send the digital data 46 to devices 52 in the customer's home network 30. The modulator-demodulator 40 may thus include an interface 54 to the gateway 50 that permits the exchange of the digital data 46. FIG. 2, for simplicity, illustrates an Ethernet interface 56. One or more physical cables 58 may connect the Ethernet interface 56 in the modulator-demodulator 40 to an Ethernet interface 60 in the gateway 50. The Ethernet interfaces 56 and 60 may utilize wiring and signaling protocols for networking technologies, as defined by the IEEE 802 family of standards. Because the gateway 50 and the Ethernet protocol are well-known, no detailed explanation is needed.

Figure 3:
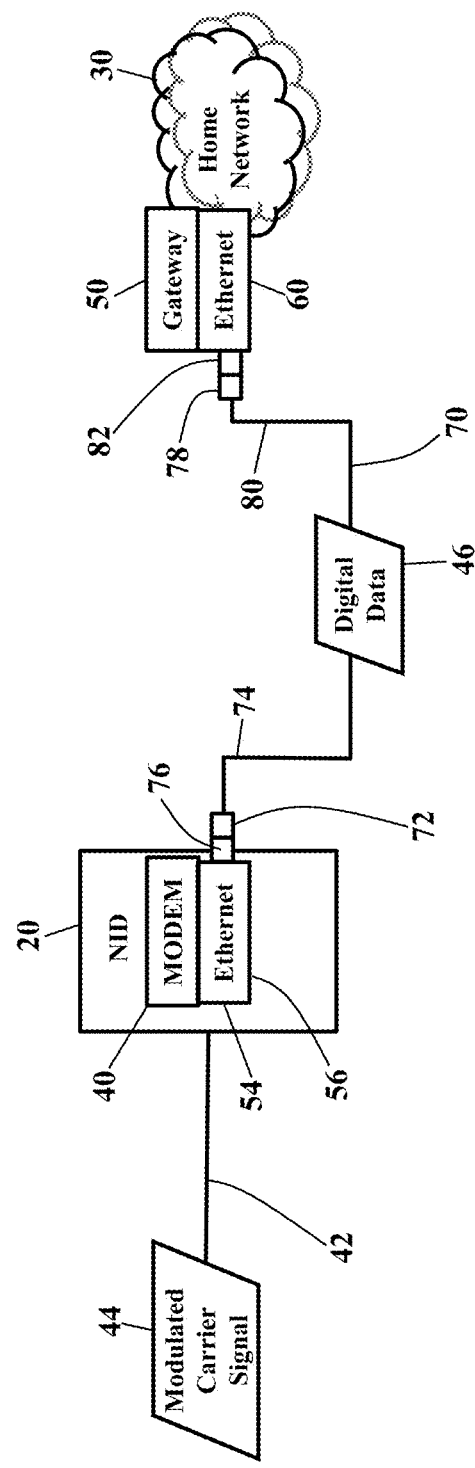

FIG. 3 further illustrates the Ethernet interface 56, according to exemplary embodiments. A first cable 70 connects the Ethernet interface 56 in the modulator-demodulator 40 to the Ethernet interface 60 in the gateway 50. The first cable 70 may be reserved for Ethernet communications between the modulator-demodulator 40 and the gateway 50. That is, if the first cable 70 is constructed according to the Category 5e or 6 standard for Gigabit Ethernet standards, then all eight (8) conductors in the first cable 70 communicate the digital data 46 between the modulator-demodulator 40 and the gateway 50 at Gigabit Ethernet frequencies. (If lower speeds are used, such as 10BASE-T or 100BASE-T, then less than eight (8) conductors in the first cable 70 may be used.) Each of the eight (8) conductors may thus be used to communicate the digital data 46 between the modulator-demodulator 40 and the gateway 50. The first cable 70 has a plug 72 at a first end 74 that mates or engages an Ethernet port 76 in the Ethernet interface 56 in the modulator-demodulator 40. The first cable 70 has an opposite plug 78 at an opposite end 80 that mates or engages an Ethernet port 82 in the gateway 50. The Ethernet port 76 in the modulator-demodulator 40 may be an RJ-56 jack that is commonly used for Ethernet cabling. The Ethernet port 82 in the gateway 50 may also be an RJ-56 jack (or any other configuration). Regardless of the pin configurations at each Ethernet port 76 and 82, each conducting pin and conductor may be dedicated or reserved for Ethernet communications between the modulator-demodulator 40 and the gateway 50. Even if the first cable 70 has more or less conductors, the conductors may still be reserved for Ethernet communications.

Figure 4:
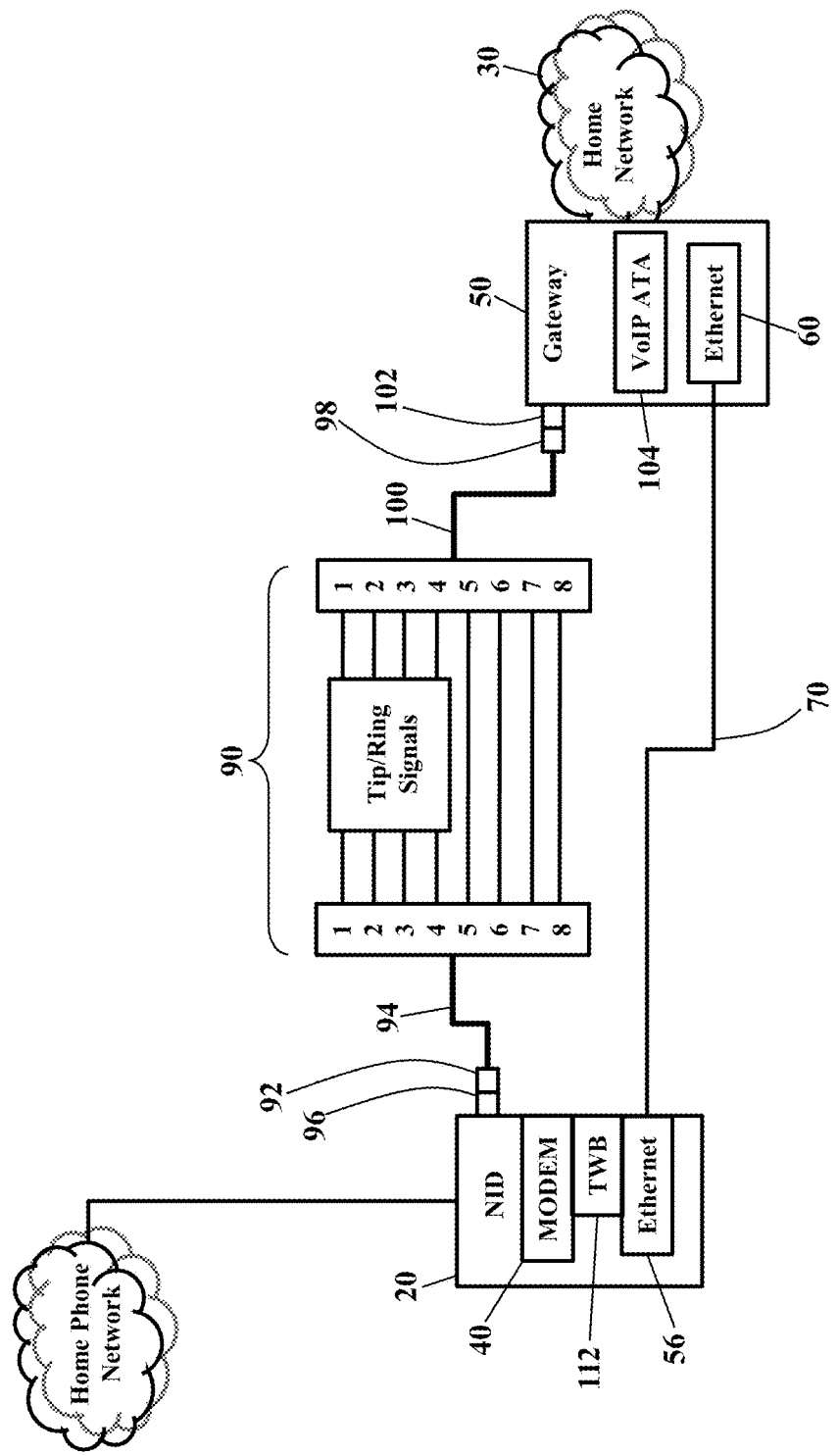

FIG. 4 illustrates a second cable 90, according to exemplary embodiments. The second cable 90 also connects the modulator-demodulator 40 to the gateway 50. Here, however, the second cable 90 may be reserved for other functions or other data. Because the first cable 70 carries information at the Gigabit Ethernet frequencies, the second cable 90 may be dedicated to telephony signals, power, and other functions or types of data and signals. FIG. 4 illustrates the second cable 90 as also being constructed according to the Category 5e or 6 standard. The second cable 90 may thus also have eight (8) conductors. The second cable 90 is illustrated in an enlarged view for clarity of the conductors and conducting pins. The second cable 90 has a plug 92 at an end 94 that mates or engages a second port 96 in the network interface device ("NID") 20. The second cable 90 has an opposite plug 98 at an opposite end 100 that mates or engages a second port 102 in the gateway 50. The second port 96 in the modulator-demodulator 40, for example, may also be an RJ-56 jack, and the second port 102 in the modulator-demodulator 40 may also be an RJ-56 jack (or any other configuration). The first cable 70 and/or the second cable 90 may, additionally or alternatively, terminate on one or more wiring blocks that provide access to the conducting pins. Moreover, when 10baseT or 100baseT Ethernet is being carried over one cable, then four (4) pins may be connected to the modem 40 and the other pins may carry voice signals and/or power.

At least some of the conductors in the second cable 90 may be reserved or dedicated to voice signals, according to exemplary embodiments. The gateway 50 may include a Voice-over Internet Protocol (or "VoIP") analog terminal adapter ("ATA") function and interface 104 that sends/receives tip and ring voice signals to/from the network interface device 20. The VoIP ATA 104 may reserve or dedicate two pairs of conductors for Voice-over Internet Protocol-derived phone lines that are communicated between the network interface device 20 and the gateway 50. The VoIP ATA 104 generates a local dial tone. The second cable 90 carries the derived phone line to the network interface device 20 where a connection is made to the telephone wiring bridge 112. The conductors in the second cable 90 that carry the VoIP-derived line tip and ring voice signals from the VoIP ATA 104 will be terminated at the telephone wiring bridge 112, which is connected to the in-home telephone wiring.

As FIG. 4 illustrates, the second port 96 in the network interface device ("NID") 20 may have multiple conducting pins (numbered "1" through "8"). Pins #1 through #4 may electrically connect to conductors #1 through #4 in the second cable 90 and to pins #1 through #4 in the second port 102 of the gateway 50. When the network interface device 20 and the gateway 50 exchange tip/ring signals, those signals may be communicated over pins #1 through #4 and over conductors #1 through #4. More or less conductors and conducting pins may be reserved for tip/ring voice signals, depending on design and usage. As FIG. 4 also illustrates, the network interface device 20 may further include a Voice-over Internet Protocol derived line connection to the telephone wiring bridge 112 and to the customer's home phone network. Here, then, the network interface device 20 may provide a connection to the customer's telephone wiring for VoIP derived line services.

The first cable 70 and the second cable 90 may share a common sheath. Even though FIG. 4 illustrates separate cables, the first cable 70 and the second cable 90 may be inter-wrapped inside a common sheath. The first cable 70 and the second cable 90, in other words, may be constructed to resemble a single cable with dual plugs at each end. Only a single routing would be required within the customer's home, so installation costs may be reduced.

Figure 5:
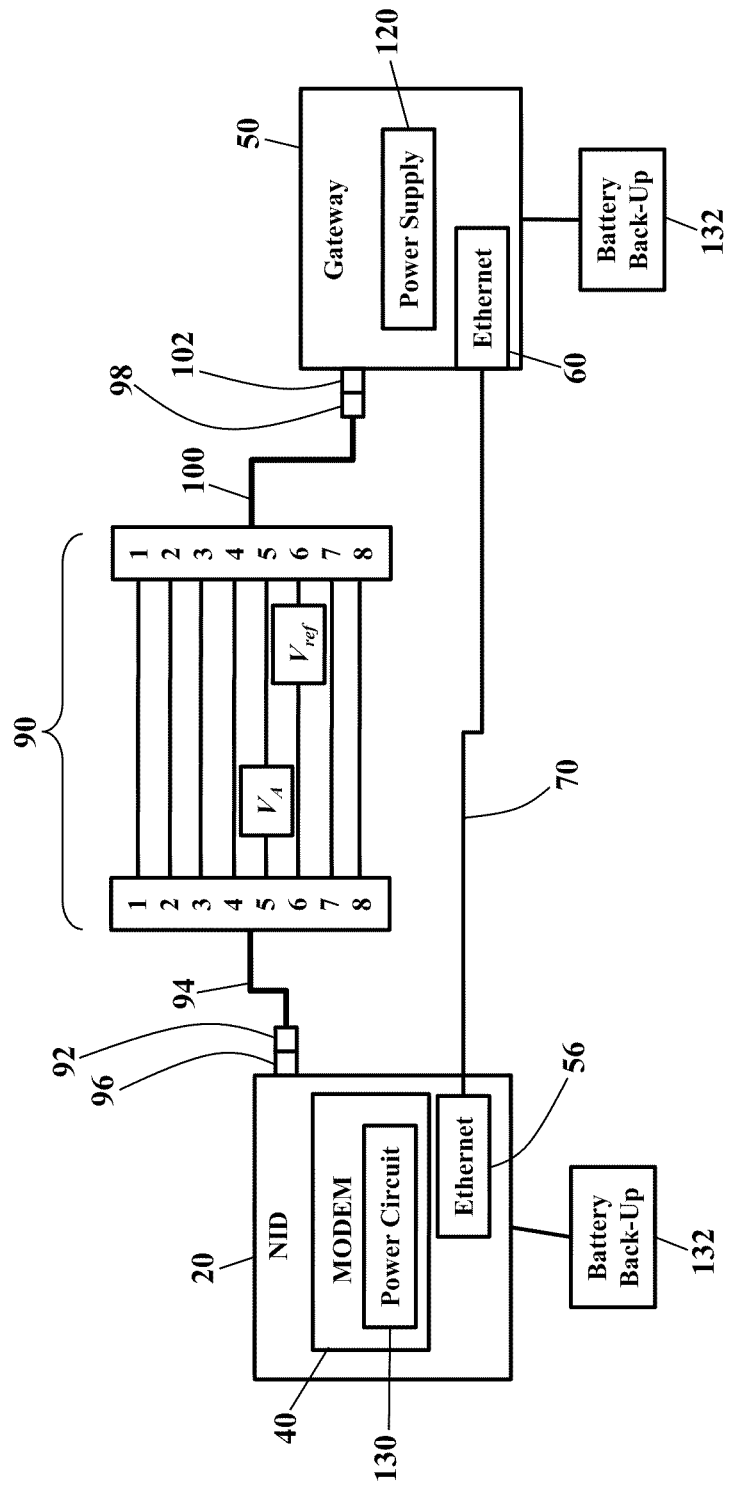

FIG. 5 illustrates another dedication, according to exemplary embodiments. Here one or more conductors may be reserved for electrical power. Two of the conducting pins, for example, may receive electrical power (e.g., AC or DC current and/or voltage) from the gateway 50. The electrical power may be received from, or applied by, a power supply 120 in the gateway 50. Here pins #5 and #6 in the second port 102 in the gateway 50 receive the electrical power from the power supply 120. Pins #5 and #6 conduct the electrical power into the second cable 90, and conductors #5 and #6 in the second cable 90 conduct the electrical power to pins #5 and #6 in the second port 96 of the modulator-demodulator 40. FIG. 5 illustrates pin #5 has an applied voltage $V_A$ and pin #6 has a reference voltage $V_{ref}$. Pin #5 and pin #6 are electrically connected to a power circuit 130 in the modulator-demodulator 40. The power circuit 130 taps or receives the electrical power from the gateway 50 and provides the electrical power to the modulator-demodulator 40. Here, then, the modulator-demodulator 40, and thus the network interface device 20, need not be supplied with separate electrical power from the electric grid. The network interface device 20 may thus be mounted or located at any location, regardless of the availability of electrical power from the electric grid. A battery back-up system 132 may locally or remotely located to also provide the electrical power.

Figure 6:
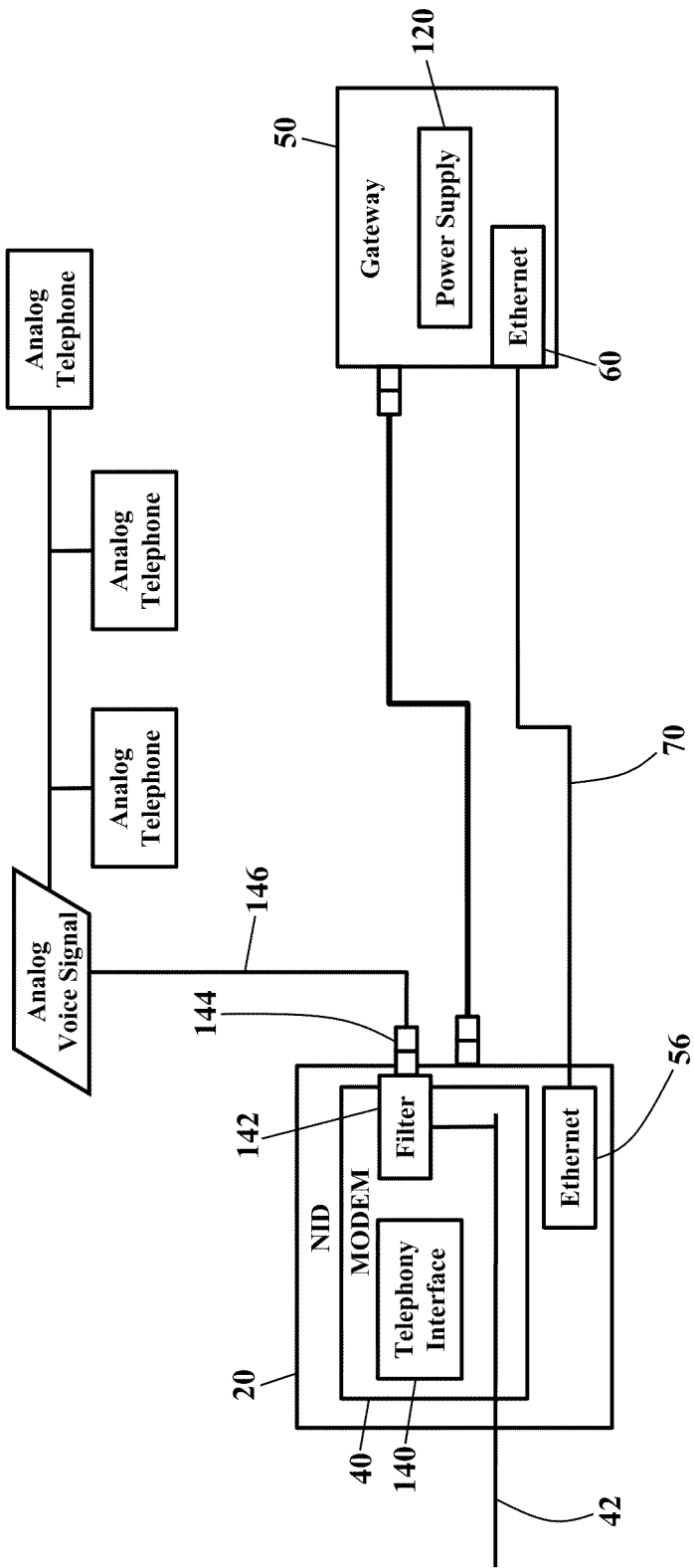

FIG. 6 illustrates an analog telephony configuration, according to exemplary embodiments. Here the modulator-demodulator 40 may include a telephony interface 140 that receives analog voice signals from the input connection 42. A filter 142 may be connected to the input connection 42 to separate analog voice frequencies from data frequencies. The telephony interface 140 may then send the analog voice signals to a telephony port 144. A common telephone line or cable 146 may then mate to the telephony port 144 and distribute an analog voice signal to one or more analog telephones 148.

Figure 7:
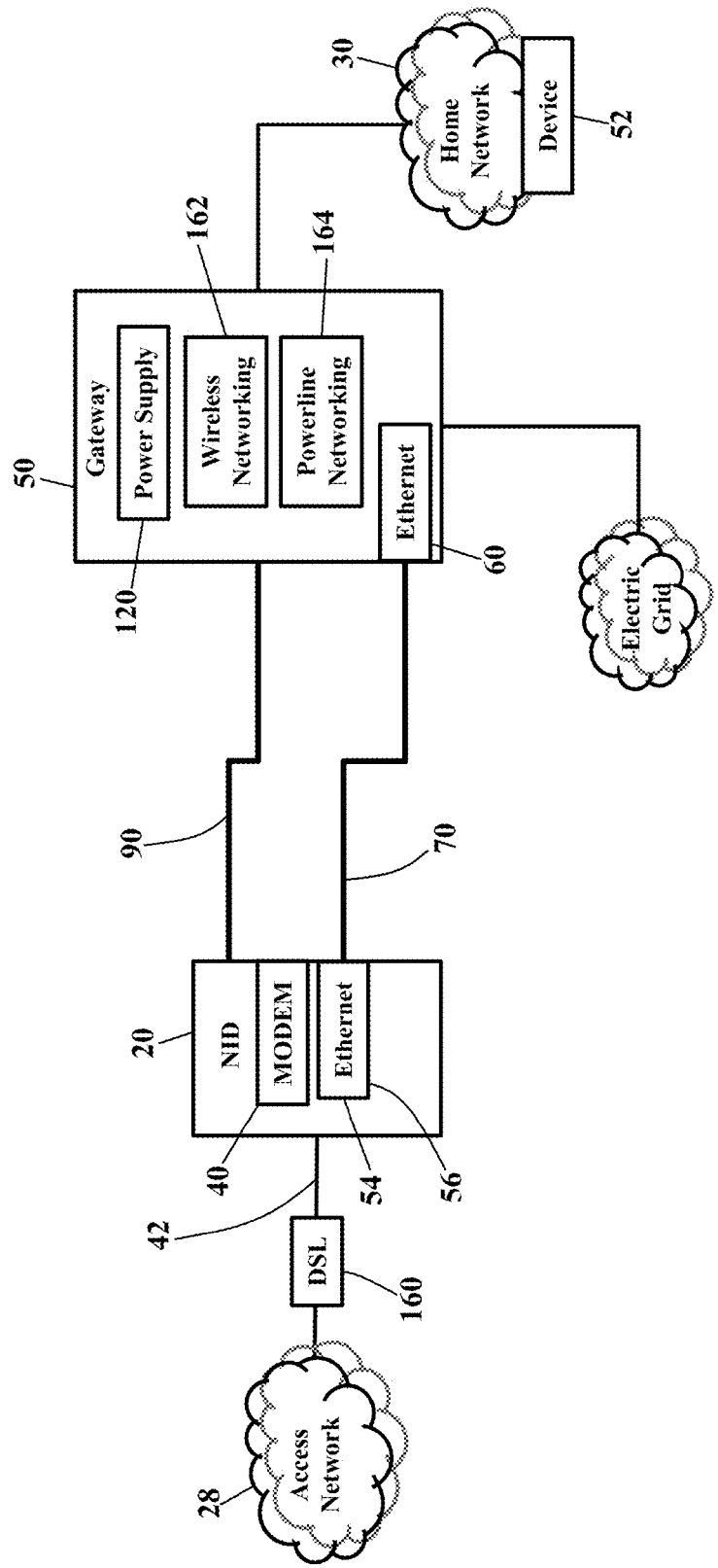
FIGS. 7 and 8 are more detailed schematics illustrating the operating environment, according to exemplary embodiments.
Figure 8:
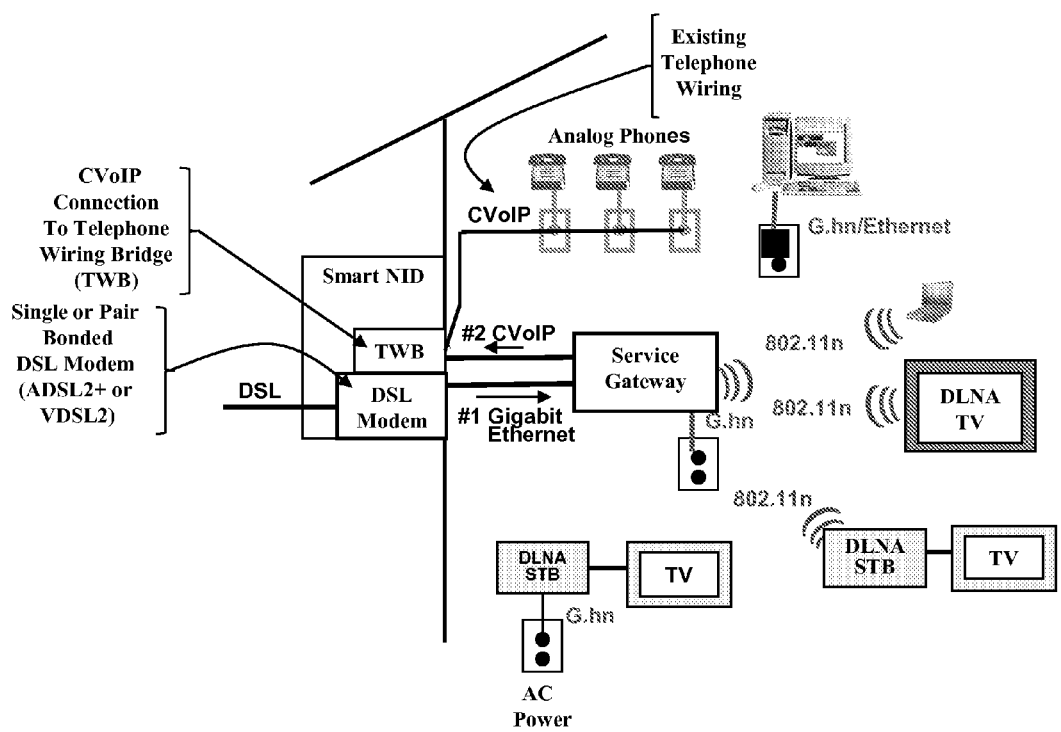

FIGS. 7 and 8 are more detailed schematics illustrating the operating environment, according to exemplary embodiments. The network interface device 20 communicates with the gateway 50, and the modulator-demodulator 40 has the input connection 42 to a digital subscriber line 160 ("DSL") in the access network 28. The first cable 70 may be reserved for Ethernet communications between the modulator-demodulator 40 and the gateway 50. The gateway 50 receives electrical power from the electrical grid, and some conductors in the second cable 90 conduct the electrical power to the modulator-demodulator 40. Other conductors in the second cable 90 may be reserved for Voice-over Internet Protocol ("VoIP") data between the modulator-demodulator 40 and the gateway 50 (as FIG. 4 illustrated). The gateway 50 may also include expansion cards and/or interfaces to other networking technologies. The gateway 50, for example, may include a wireless networking interface 162 to wirelessly communicate the digital data (illustrated as reference numeral 46 in FIGS. 1-3) to and from the devices 52 in the customer's home network 30. A powerline networking interface 164 allows the gateway 50 to communicate the digital data 46 over electrical wiring. The Ethernet interface 60 in the gateway 50 may include additional ports that permit Ethernet communications with any of the devices 52 in the customer's home network 30.

The network interface device 20, too, may include expansion cards and/or interfaces. Because the modulator-demodulator 40 communicates with the digital subscriber line 160, the modulator-demodulator 40 may support any DSL technology (such as ADSL, VDSL, or any other technology). The network interface device 20 and/or the modulator-demodulator 40 may include an ADSL/VDSL combination board with a hard or soft switch for control of either standard. If fiber optic lines are used, the modulator-demodulator 40 may include fiber optic networking ("FON") expansion card to support fiber optic standards and technologies. Because the modulator-demodulator 40 may also include Voice-over Internet Protocol capabilities (as explained and described above), the modulator-demodulator 40 may include an analog telephony adapter (or "ATA") that connects one or more analog telephones to a Voice-over Internet Protocol-based network.

Exemplary embodiments are better than so-called "intelligent NIDs." An intelligent network interface device incorporates, or moves, the gateway 50 to an exterior of a dwelling or to an interior common area. Because the intelligent network interface device incorporates the functionality and/or componentry of the gateway 50, the intelligent network interface device is very expensive. Moreover, the intelligent network interface device is more prone to losses due to environmental (e.g., temperature and rain) challenges. The heat generated by an intelligent network interface device is compounded by warm or summer ambient environmental temperatures, so intelligent network interface devices have exhibited unacceptable packet loss. An intelligent network interface device is also more costly when subjected to vandalism.

Exemplary embodiments are thus cheaper and better performing. Because the gateway 50 remains within the customer's network xx, the network interface device 20 is less expensive than an intelligent network interface device. Because the network interface device 20 does not include the functionality of the gateway 50, the network interface device 20 requires less electrical power than an intelligent network interface device. Heat, humidity, rain, dust/dirt, and other environmental concerns are reduced. The network interface device 20 may be replaced or upgraded without impacting the customer's network xx, and the network interface device 20 supports proactive monitoring of the access network 28 (e.g., a coaxial cable or DSL connection). Indeed, the access network 28 may be changed without impacting the customer's network xx, thus allowing an easier change from ADSL to VDSL or from VDSL to fiber.

Figure 9:
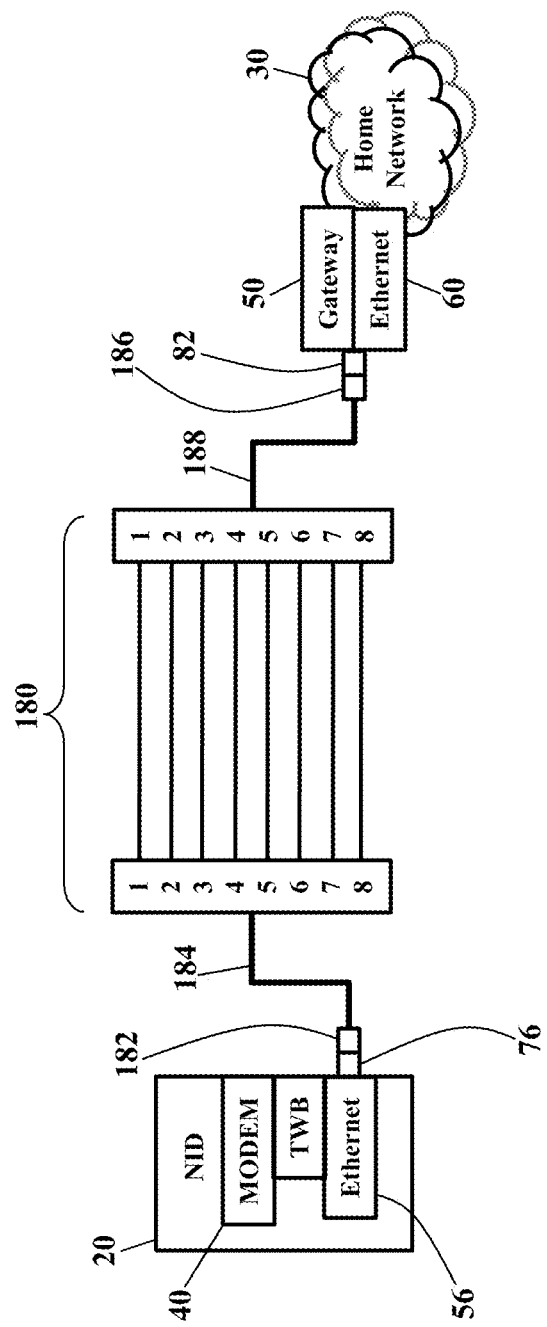
FIG. 9 is another schematic illustrating the operating environment, according to exemplary embodiments.
Figure 10:
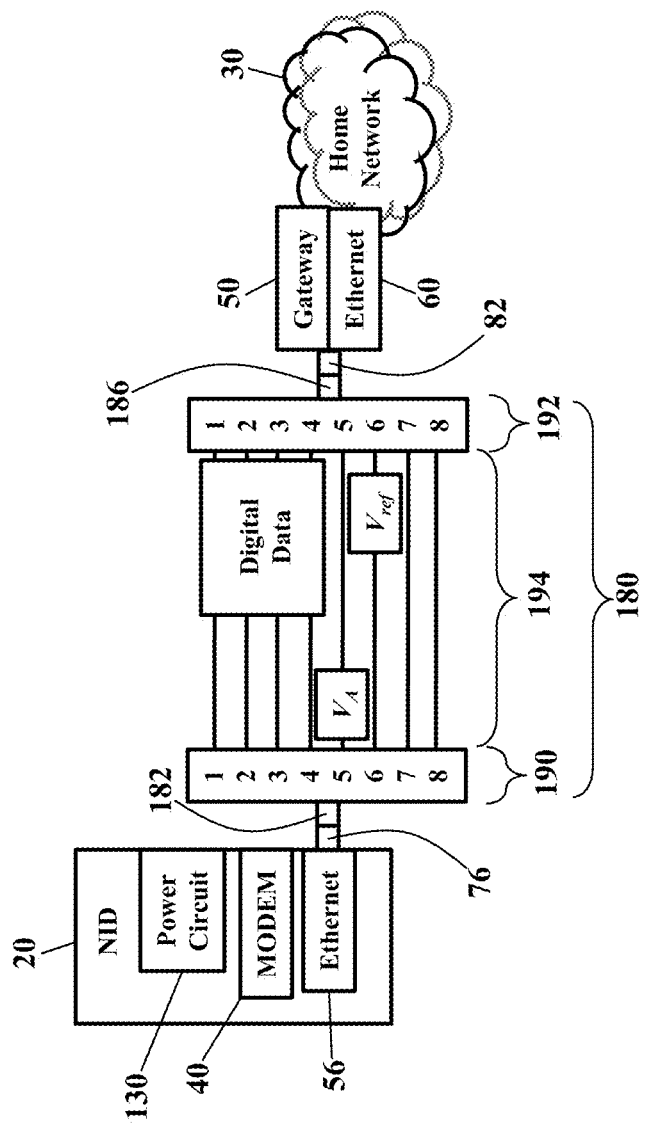
Figure 11:
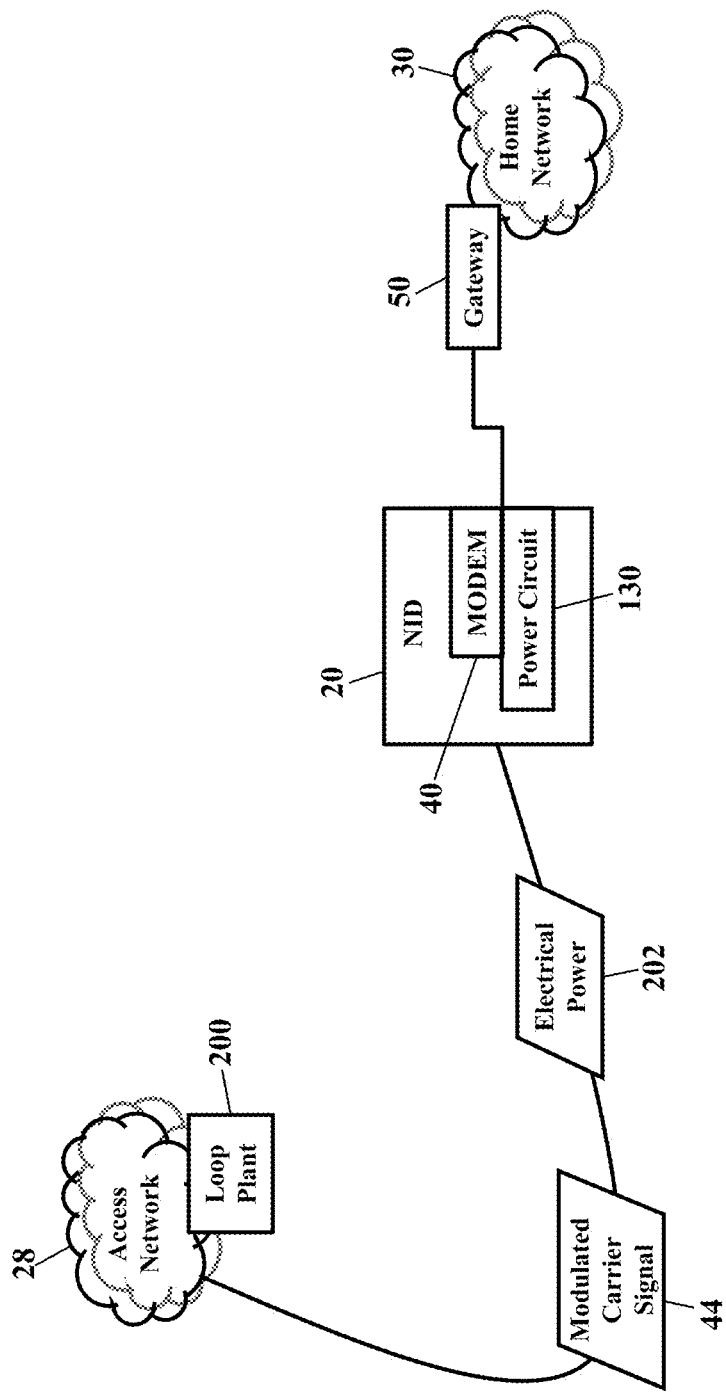
FIGS. 11-14 are schematics illustrating loop plant electrical power, according to exemplary embodiments.

FIGS. 9 and 10 are schematics further illustrating the operating environment, according to exemplary embodiments. Here the network interface device 20 and the gateway 50 are connected by a single cable 180. The single cable 180 has a plug 182 at a first end 184 that mates or engages the Ethernet port 76 in the Ethernet interface 56 in the modulator-demodulator 40. The single cable 180 has an opposite plug 186 at an opposite end 188 that mates or engages the Ethernet port 82 in the gateway 50. If the single cable 180 is again constructed according to the Category 5e or 6 standard, then the single cable 180 may have eight (8) conductors. The Ethernet port 76 in the modulator-demodulator 40, and the Ethernet port 82 in the gateway 50, may each be an RJ-56 female jack that is commonly used for Ethernet cabling (any other configuration, of course, may be used).

FIG. 10 illustrates pin assignments. Each Ethernet port 76 and 82 may have multiple conducting pins (numbered, respectively, as 190 and 192), and each of the conducting pins electrically connects to one of the multiple conductors 194 in the single cable 180. Each of the eight (8) conductors may be dedicated. Regardless of the pin configurations at each Ethernet port 76 and 82, each conducting pin and each conductor may be dedicated or reserved for certain types of data, functions, and/or electrical power. Some of the eight (8) conducting pins 190 and 192, for example, may be dedicated to the digital data 46. FIG. 10 illustrates four (4) conducting pins (e.g., pins #1 through #4) that are reserved for sending and receiving the digital data 46 using the Ethernet interface 56 in the modulator-demodulator 40. Pins #1 through #4 electrically connect to the Ethernet interface 56 in the modulator-demodulator 40 and communicate the digital data 46 to the conductors #1 through #4 in the single cable 180. The conductors #1 through #4 communicate the digital data 46 to pins #1 through #4 in the Ethernet port 82 in the gateway 50. Exemplary embodiments may thus reserve and dedicate pins #1 through #4 in the Ethernet interface 56 of the modulator-demodulator 40 for communications using the Ethernet standard between the modulator-demodulator 40 and the gateway 50. More or less than four conducting pins and conductors may be reserved or dedicated to Ethernet communications, depending on the design requirements, bandwidth considerations, and the number of available conducting pins and conductors.

Other conducting pins and conductors may be dedicated to electrical power. Two of the remaining conducting pins, for example, may receive the electrical power from the power supply (illustrated as reference numeral 120 in FIG. 5) in the gateway 50. Here pins #5 and #6 in the Ethernet port 82 in the gateway 50 receive the electrical power and conduct the electrical power to conductors #5 and #6 in the single cable 180. Pin #5 in the Ethernet port 76 of the modulator-demodulator 40 conveys an applied voltage $V_A$ and pin #6 has a reference voltage $V_{ref}$. Pin #5 and pin #6 are electrically connected to the power circuit 130 in the modulator-demodulator 40. The power circuit 130 taps or receives the electrical power from the gateway 50 and provides the electrical power to the modulator-demodulator 40. The modulator-demodulator 40, then, need not be supplied with separate electrical power from the electric grid.

FIGS. 11-14 are schematics illustrating loop plant electrical power, according to exemplary embodiments. Here the modulator-demodulator 40 may receive electrical power from a loop plant 200. The loop plant 200 may apply electrical power to the access network 28. The loop plant 200, for example, may be a cable network operating in the radio-frequency domain and/or the Internet Protocol (IP) domain. The loop plant 200, however, may also include copper wires, fiber optic lines, and/or hybrid-coaxial lines. The loop plant 200 may even include wireless portions utilizing any portion of the electromagnetic spectrum and any signaling standard (such as the I.E.E.E. 802 family of standards, GSM/CDMA/TDMA or any cellular standard, and/or the ISM band). The loop plant 200 may even include electrical powerline portions, in which signals are communicated via electrical wiring. Exemplary embodiments may be applied to any wireless/wireline communications network, regardless of physical componentry, physical configuration, or communications standard(s).

Figure 12:
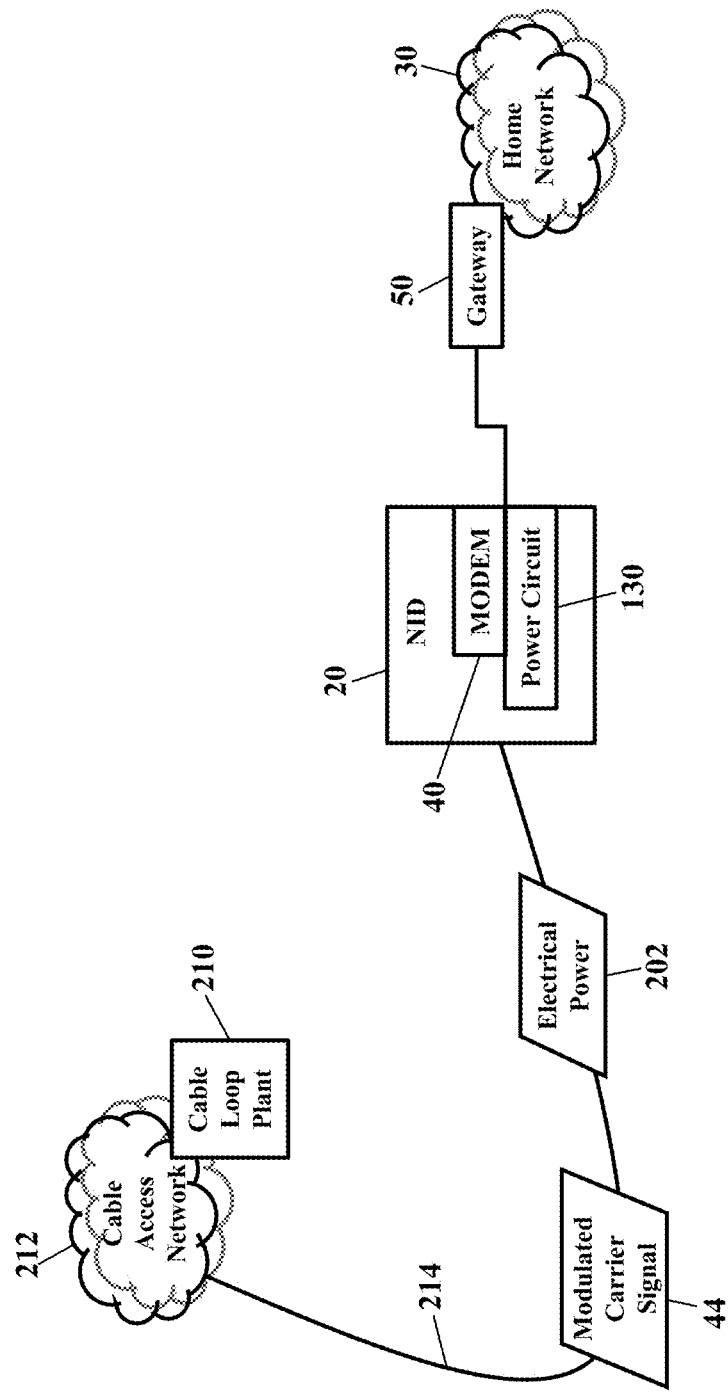
Figure 13:
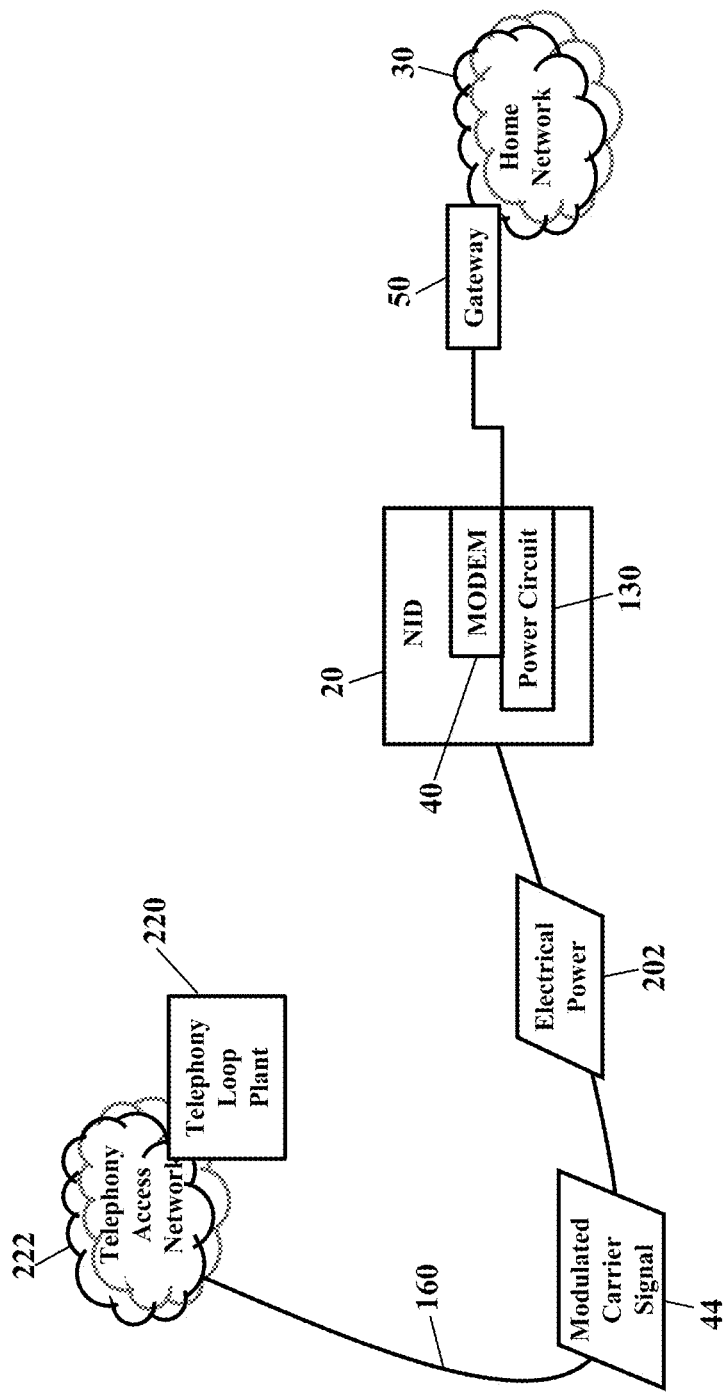
Figure 14:
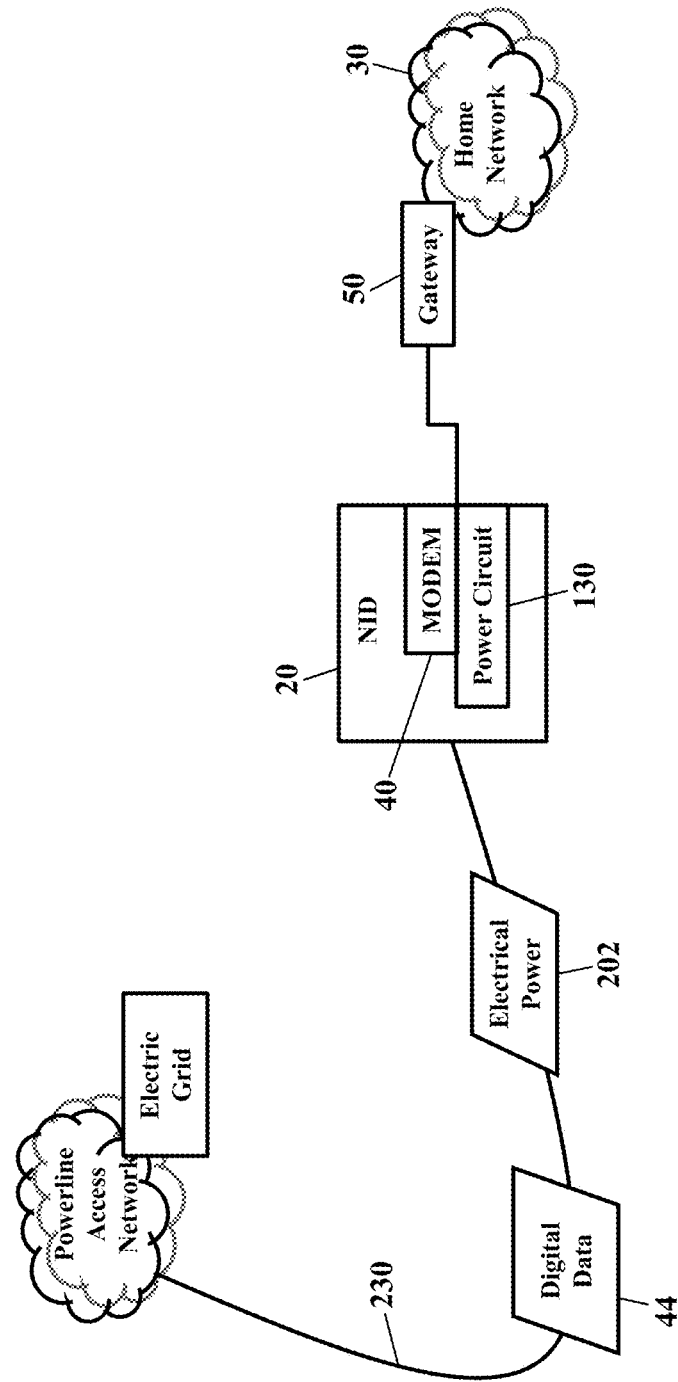

The network interface device 20 may receive electrical power from the access network 28. When the loop plant 200 applies a voltage and/or current to the access network 28, the input connection 42 may comprise the modulated carrier signal 44 and electrical power 202 from the loop plant 200. The power circuit 130 in the modulator-demodulator 40 taps or receives the electrical power 202 from the input connection 42 and provides the electrical power 202 to the modulator-demodulator 40. FIG. 12, for example, illustrates a cable loop plant 210 that applies the electrical power 202 to a cable access network 212. A coaxial or fiber optic cable 214 delivers the modulated carrier signal 44 and the electrical power 202 to the modulator-demodulator 40. FIG. 13 illustrates a telephony (or plain old telephone system) loop plant 220 that applies the electrical power 202 to the digital subscriber line 160. The power circuit 130 receives the electrical power 202 applied to the digital subscriber line 160 and provides the electrical power 202 to the modulator-demodulator 40. FIG. 14 illustrates an electrical powerline networking embodiment that sends the digital data 46 and the electrical power 202 over an electrical powerline 230. The power circuit 130 receives the electrical power 202 applied to the electrical powerline 230 and provides the electrical power 202 to the modulator-demodulator 40. Here, then, the network interface device 20 and the modulator-demodulator 40 need not rely on electrical power from the gateway 50, and some embodiments need not rely on electrical power from the electric grid. A failure in the electric grid thus need not affect the modulator-demodulator 40, so communications are maintained during electrical outages.

Figure 15:
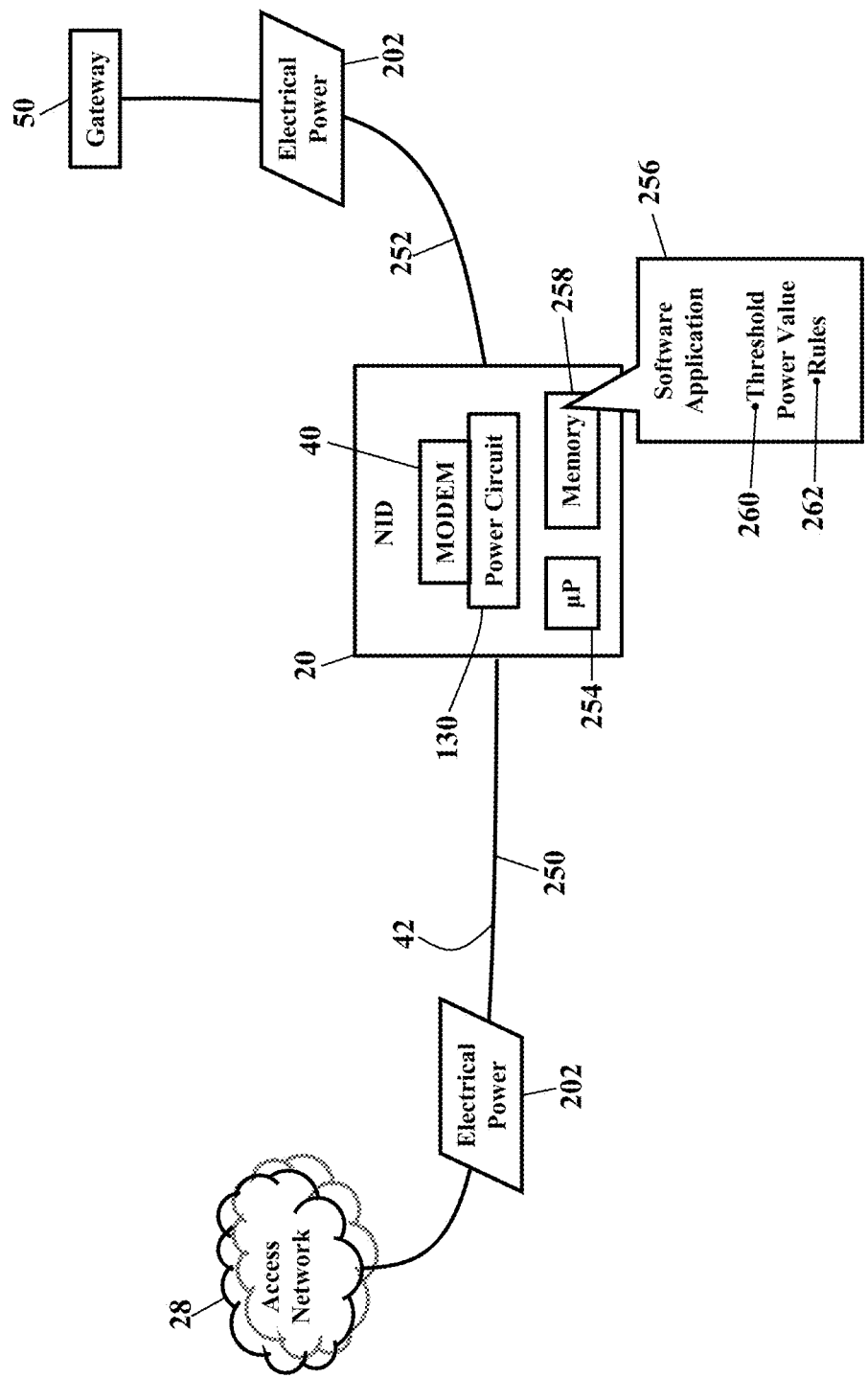
FIG. 15 is a schematic illustrating means for switching between power connections, according to exemplary embodiments.

FIG. 15 is a schematic illustrating means for switching between power connections, according to exemplary embodiments. As the above paragraphs explained, the modulator-demodulator 40 may receive the electrical power 202 from two different power connections. A first power connection 250 receives the electrical power 202 from the gateway 50, and a second power connection 252 receives the electrical power 202 from the input connection 42. The first power connection 250 and the second power connection 252 may both be available to provide the electrical power 202 to the modulator-demodulator 40. Exemplary embodiments may thus include means for switching between the first power connection 250 and the second power connection 252 to maintain the electrical power 202 to the modulator-demodulator 40. The modulator-demodulator 40, for example, may include a processor 254 (e.g., "μP"), application specific integrated circuit (ASIC), or other component that executes a software application 256 stored in a memory 258. The software application 256 may include code or instructions that cause the processor 254 to perform modulation and demodulation functions and to perform networking functions. The software application 256, however, may additionally or alternatively include code or instructions that cause the processor 254 to continuously or periodically monitor the electrical power 202 available from the gateway 50 and from the input connection 42 to the access network 28. That is, software application 256 may cause the processor 254 to monitor the electrical power 202 available from the first power connection 250 and from the second power connection 252. The electrical power 202 available from the first power connection 250 is compared to a threshold power value 260. The electrical power available from the second power connection 252 is also compared to the threshold power value 260. The threshold power value 260 may represent a minimum voltage, current, or electrical power (AC or DC) that is required by the modulator-demodulator 40 to safely or minimally perform the modulation, demodulation, networking, and/or any other function. When either the first power connection 250 or the second power connection 252 is less than the threshold power value 260, then the software application 256 may cause the processor 254 to instruct the power circuit 130 to switch to the power connection that satisfies the threshold power value 260. When both the first power connection 250 and the second power connection 252 satisfy (e.g., greater than or equal to) the threshold power value 260, then the software application 256 may cause the processor 254 to instruct the power circuit 130 to prefer one of the power connections. During times of congestion, for example, the access network 28 may be overburdened by electrical power demands from many modulator-demodulators. Intelligence in the access network 28 may thus send a message to the modulator-demodulator 40 that causes the power circuit 130 to switch to the first power connection 250 and to receive electrical power from the gateway 50. Additional rules 262 may be stored in the memory 258 that describe other conditions for when either the first power connection 250 or the second power connection 252 is preferred. The means for switching between the power connections 250 and 252 may additionally or alternatively include relays or solenoids that move or switch connections in response to the electrical power 202 available from the first and second power connections 250 and 252.

Figure 16:
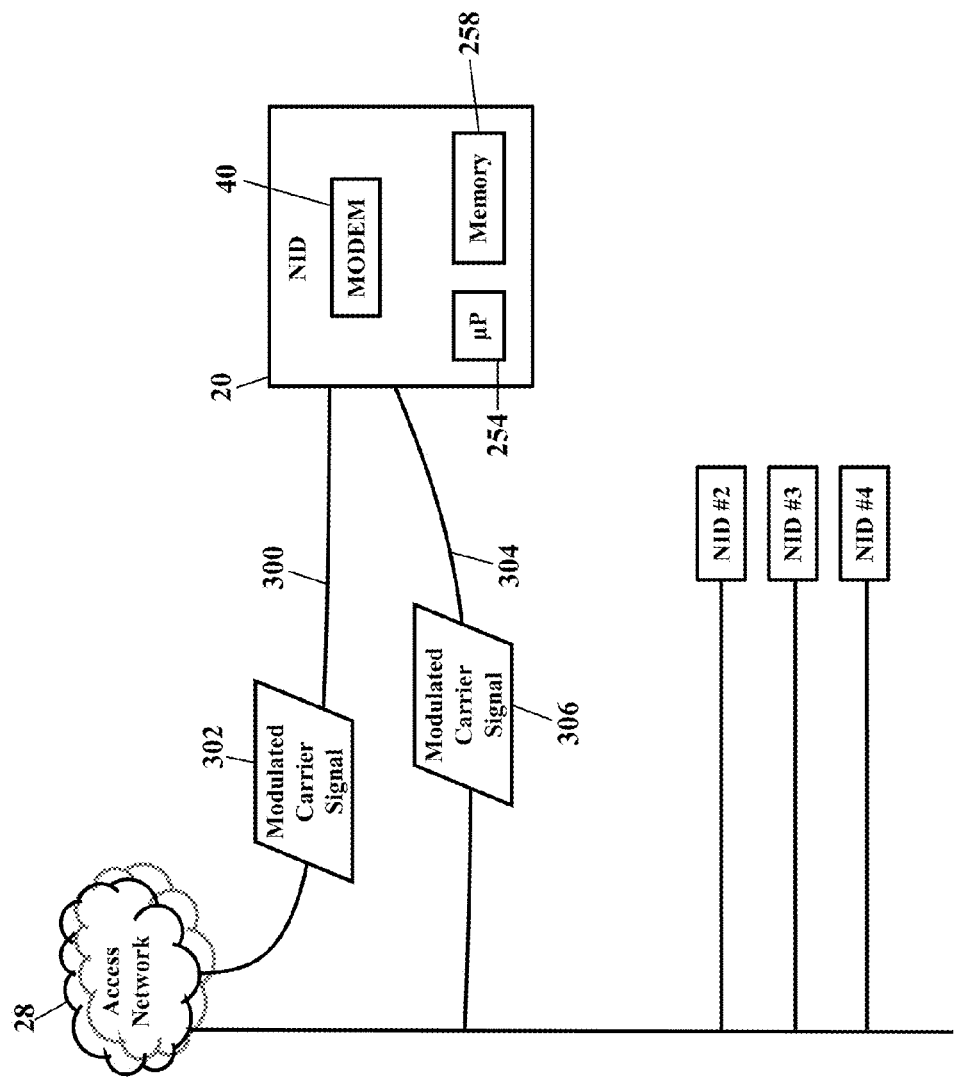
FIG. 16 is a schematic illustrating bonded input connections, according to exemplary embodiments.

FIG. 16 is a schematic illustrating bonded input connections, according to exemplary embodiments. Here the network interface device 20 and/or the modulator-demodulator 40 may have two input connections. A first input connection 300 provides a first modulated input signal 302 to the modulator-demodulator 40, and a second input connection 304 provides a second modulated input signal 306 to the modulator-demodulator 40. The first modulated input signal 302 may be delivered by any physical medium (such as cable, copper lines, or fiber) or by a wireless medium to the subscriber's premise. The second modulated input signal 306 may also be delivered by any physical or wireless medium, and the first modulated input signal 302 may be delivered by a different medium than the second modulated input signal 306. Regardless, the first input connection 300 may be connected and logically bonded to the network interface device 20 and/or the modulator-demodulator 40. The second input connection 304 is also connected to the modulator-demodulator 40, but the second input connection 304 is also connected to other network interface devices (illustrated as reference numerals 308, 310, and 312) at other customers' premises. The second input connection 304 is thus shared among multiple customers' premises. When the modulator-demodulator 40 requires communications service that exceeds an available bandwidth of the first input connection 300, then the modulator-demodulator 40 may temporarily dedicate and logically bond the second input connection 304 to provide additional bandwidth. The first input connection 300 and the second input connection 304 share the same session of information, such that the requested communications service is received via the logically bonded first input connection 300 and the temporarily dedicated and logically bonded second input connection 304. When the additional bandwidth is no longer needed, the processor 254 in the modulator-demodulator 40 may remove the temporary dedicated and logically bonded second input connection 304, such that the second input connection 304 reverts to its shared configuration, thus allowing the another customer to receive increased bandwidth when required.

Figure 17:
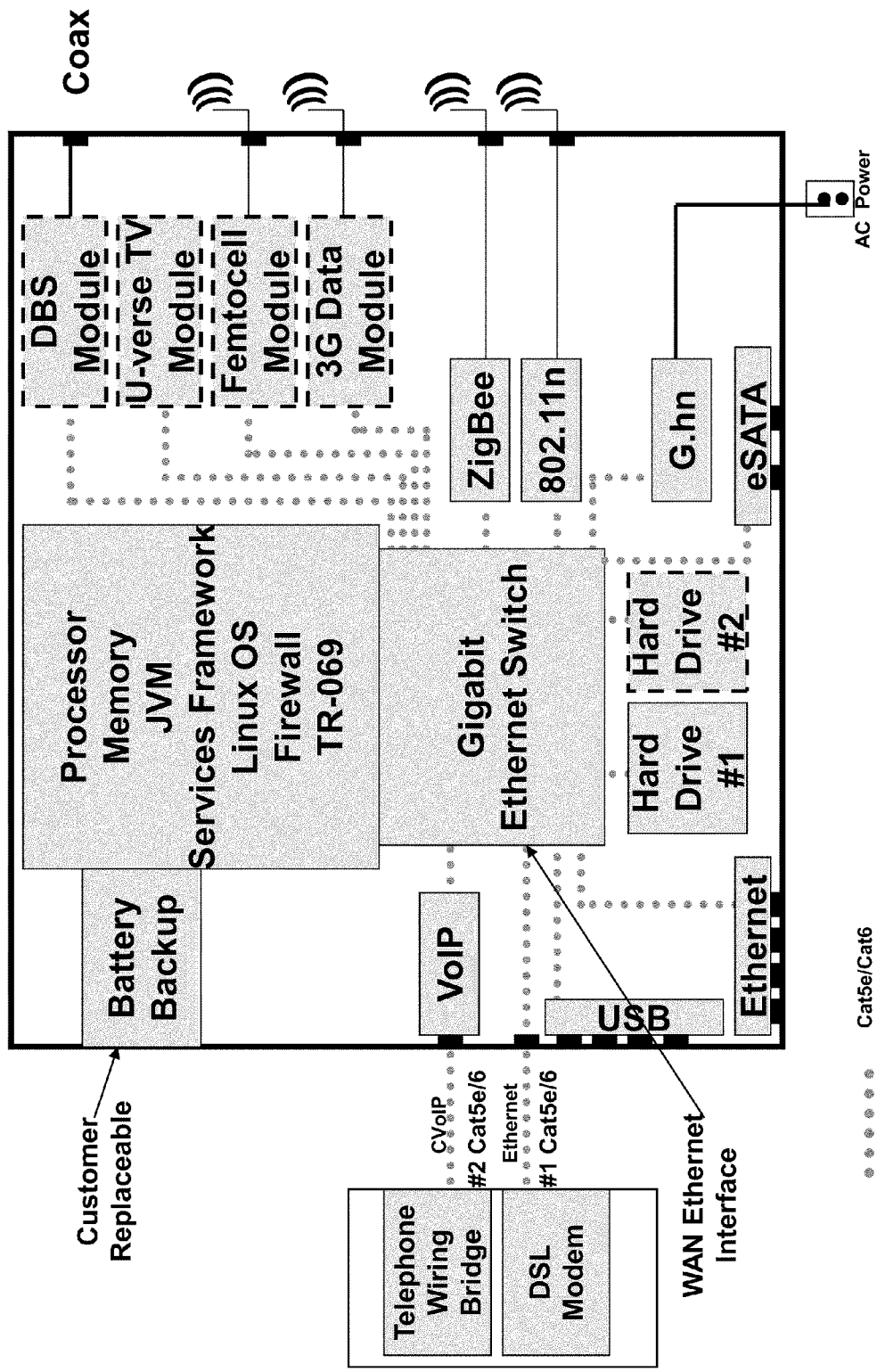
FIG. 17 is a detailed block diagram of the operating environment, according to exemplary embodiments.

FIG. 17 is a detailed block diagram of the operating environment, according to exemplary embodiments. Here again the network interface device 20 is illustrated as having two (2) Category 5e/6 connections to the gateway 50. FIG. 17 also illustrates a Gigabit Ethernet switch, multiple hard drives, optional modules (such as DBS, U-verse, Femtocell, and 3G), and other components.

Figure 18:
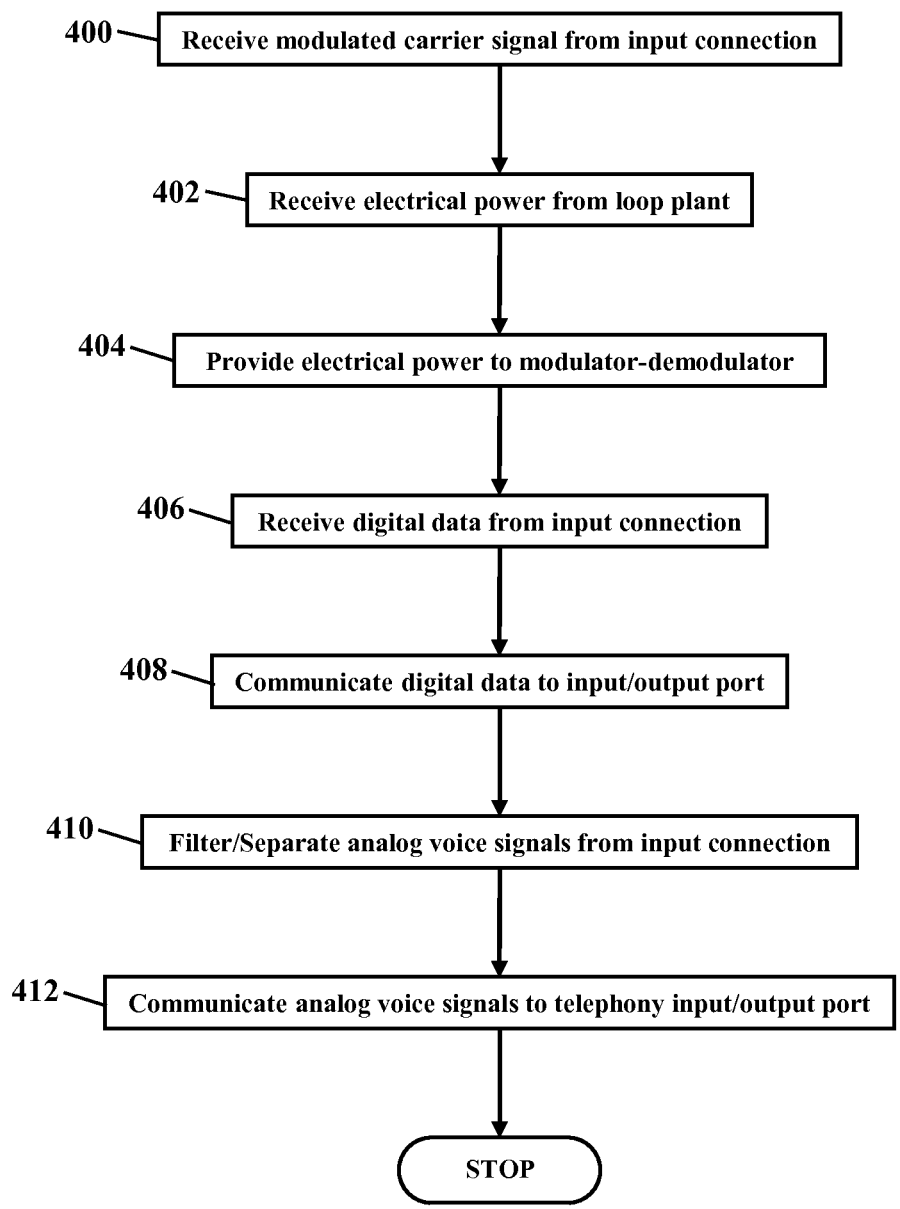
FIGS. 18-20 are flowcharts illustrating a method of providing modulator-demodulator 40 functions, according to exemplary embodiments.

FIG. 18 is a flowchart illustrating a method of providing modulator-demodulator 40 functions, according to exemplary embodiments. A modulator-demodulator receives a modulated carrier signal from an input connection (Block 400). Electrical power is received from a loop plant (Block 402). The electrical power is provided to the modulator-demodulator (Block 404). Digital data may also be received from the input connection (Block 406). The digital data may be communicated to an input/output port (Block 408). Analog voice signals may be filtered or separated from the input connection (Block 410). The analog voice signals may be communicated to a telephony input/output port (Block 412).

Figure 19:
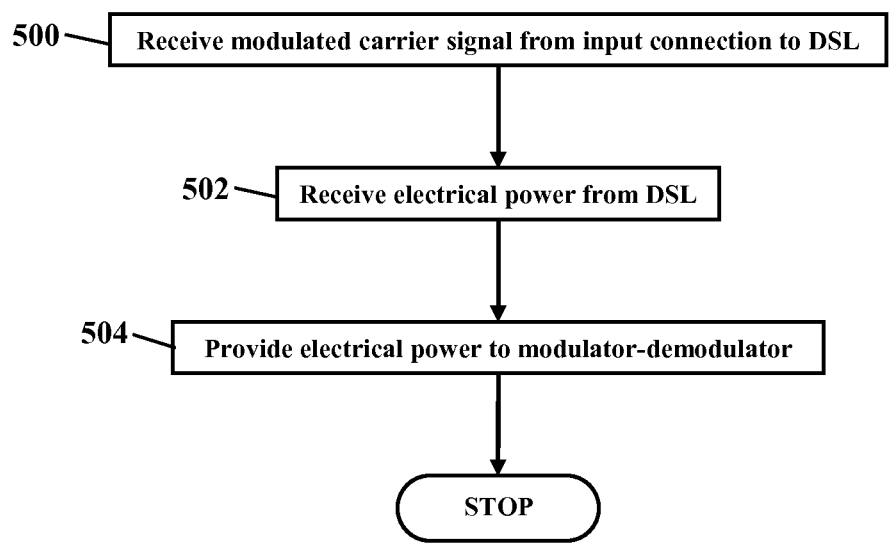

FIG. 19 is another flowchart illustrating the method of providing modulator-demodulator 40 functions, according to exemplary embodiments. A modulator-demodulator receives a modulated carrier signal from an input connection to a digital subscriber line (Block 500). Electrical power is received from the digital subscriber line (Block 502). The electrical power is provided to the modulator-demodulator (Block 504).

Figure 20:
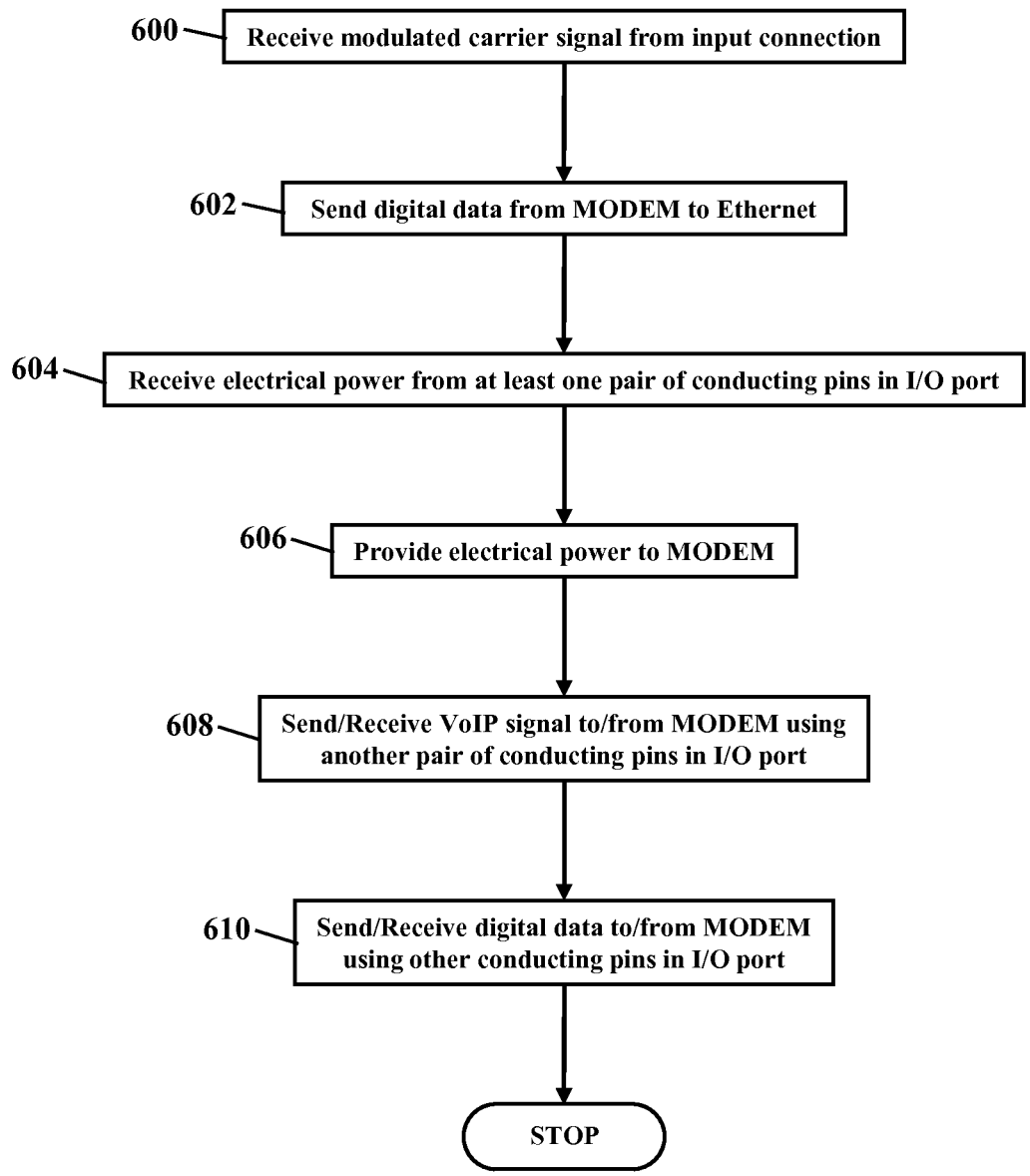

FIG. 20 is another flowchart illustrating the method of providing modulator-demodulator 40 functions, according to exemplary embodiments. A modulator-demodulator receives a modulated carrier signal from an input connection (Block 600). An Ethernet interface receives digital data from the modulator-demodulator (Block 602). An input/output port receives electrical power from at least one pair of conducting pins (Block 604). The electrical power is provided to the modulator-demodulator (Block 606). Another pair of conducting pins in the input/output port may send/receive VoIP data to/from the modulator-demodulator (Block 608). Other conducting pins in the input/output port send/receive digital data to/from the modulator-demodulator 40 (Block 610).

Exemplary embodiments may be incorporated into other processor-controlled devices. The exemplary embodiments, for example, may be incorporated into a personal digital assistant (PDA), a Global Positioning System (GPS) device, an interactive television, an Internet Protocol (IP) phone, a pager, a cellular/satellite phone, or any computer system and/or communications device utilizing a digital signal processor (DSP). The processor-controlled devices may also include watches, radios, vehicle electronics, clocks, printers, gateways, and other apparatuses and systems.

Exemplary embodiments may be physically embodied on or in a computer-readable storage medium. This computer-readable medium may include CD-ROM, DVD, tape, cassette, disk, memory card, and large-capacity disk. The computer-readable medium, or media, could be distributed to end-users, licensees, and assignees. A computer program product for providing communications services and/or modulator-demodulator functions comprises the computer-readable medium and processor-readable instructions, as the above paragraphs explained.

While exemplary embodiments have been described with respect to various features, aspects, and embodiments, those skilled and unskilled in the art will recognize exemplary embodiments are not so limited. Other variations, modifications, and alternative embodiments may be made without departing from the spirit and scope of the claims.

What is claimed is:

1. A network interface device comprising:
    a modulator-demodulator installed within an outdoor enclosure that receives a modulated carrier signal from an input connection;
    an Ethernet interface that receives digital data from the modulator-demodulator;
    a first port having eight conducting pins, with four of the eight conducting pins reserved for Ethernet signals received from the Ethernet interface, and with two of the eight conducting pins receiving electrical power and providing the electrical power to the modulator-demodulator; and
    a power circuit having a first power connection and a second power connection, the first power connection connected to the two of the eight conducting pins that receives the electrical power, and the second power connection connected to the input connection to receive electrical power from a loop plant and provide the electrical power to the modulator-demodulator.

2. The network interface device according to claim 1, further comprising a filter connected to the input connection that separates analog voice frequencies from data frequencies.

3. The network interface device according to claim 2, further comprising a telephone wiring bridge that receives the analog voice frequencies and sends the analog voice frequencies to another two of the eight conducting pins.

4. The network interface device according to claim 2, further comprising a power circuit connected to the two of the eight conducting pins that receives the electrical power.

5. The network interface device according to claim 1, further comprising a second input connection that receives another modulated carrier signal.

6. The network interface device according to claim 1, further comprising a second port having eight conducting pins, with the eight conducting pins of the second port reserved for additional Ethernet signals received from the Ethernet interface.

7. The network interface device according to claim 1, further comprising means for switching between the first power connection and the second power connection to maintain the electrical power to the modulator-demodulator.

\* \* \* \* \*